Patented Oct. 20, 1936

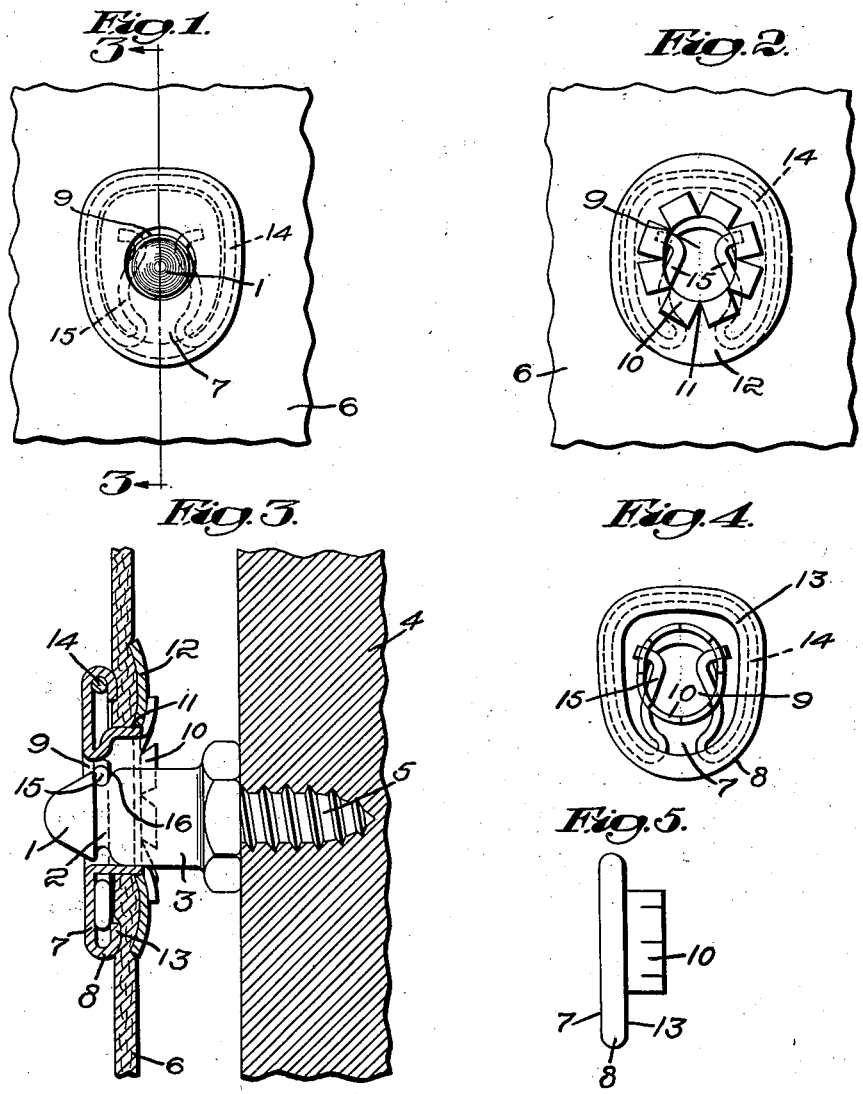

2,058,296

UNITED STATES PATENT OFFICE 2,058,296

THREE-SIDE LOCK FASTENER

Moses F. Carr, Lincoln, Mass., assignor to United-Carr Fastener Corporation, Cambridge, Mass., a corporation of Massachusetts Application January 12, 1933, Serial No. 651,291

7 Claims. (Cl. 24—218)

My invention aims to provide improvements in three-side lock fasteners.

In the drawing which illustrates a preferred embodiment of my invention:—

Figure 1 is a front elevation of a complete three-side lock fastener installation;

Fig. 2 is a rear elevation of the socket installation;

Fig. 3 is an enlarged section taken on the line 3—3 of Figure 1;

Fig. 4 is a rear elevational view of the stud-receiving part of the socket installation prior to attachment; and Fig. 5 is a side elevation of the part illustrated in Fig. 4.

While I have illustrated in the drawing my invention as applied to three-side lock fasteners, because it is particularly adapted therefor, I wish to have it understood that certain features of my invention may be useful in connection with fasteners other than the so-called three-side lock type.

Heretofore three-side lock fasteners of the general type illustrated have not included a socket installation wherein the stud-receiving part was attached to the carrying medium by a tubular rivet. No suitable structure was available in connection with automatic machine attachment of the socket parts of an installation wherein the metallic parts are non-circular in outline.

I have solved the problem by providing a simple structure reduced to a minimum number of parts and at the same time providing for a durable and strong attachment which is also finished in appearance.

In the particular embodiment of my invention illustrated by the accompanying drawing I have shown a well known stud member having a head 1, a neck 2 and a shank 3 secured to a rigid supporting structure 4 by means of a screw 5. It should be understood that any other suitable stud structure may be used depending upon the structure of the socket for engagement therewith. The socket installation comprises a stud-receiving part formed from sheet metal and being of the usual oval-shaped construction in peripheral outline, as illustrated in Figure 1. The stud-receiving part is located at one side of a flexible carrying medium 6 and has a front face 7 spaced from the carrying medium 6 by a peripheral wall 8, as illustrated in Fig. 3. The stud-receiving aperture 9 is provided in the stud-receiving part (Figs. 3 and 4) by pressing material from the front face portion 7 to provide a tubular rivet 10 extending from the front face through the carrying medium 6 and through an aperture 11 in an attaching plate 12 located at the opposite side of the carrying medium 6, as best illustrated in Fig. 3. The free end portion of the rivet 10 is upset laterally outwardly against the face of the plate 12, thereby securing the parts of the installation together and clamping the flexible carrying medium 6 between the attaching plate 12 and a flange portion 13 extending inwardly from the peripheral wall portion 8 of the stud-receiving part. Any suitable stud-engaging means may be provided as a part of the stud-receiving structure, depending upon the type of fastener desired to be provided. In the particular structure illustrated I have shown a spring member 14 located in the stud-receiving part and having yieldable stud-engaging jaws 15 passing through slots 16 in the rivet 10 (Figs. 3 and 4) and intersecting the stud-receiving aperture 9, as best illustrated in Figs. 2 and 4.

In order to facilitate attachment of the parts of the socket installation, it will be readily understood by those skilled in the art that it is highly desirable to construct the parts in such a manner that the stud-receiving part and the attaching plate may be fed from hoppers to suitable die means in the usual type of attaching machines regardless of which end of the attaching part 12 is adjacent to an end of the stud-receiving part. Since in the structure which I have selected for illustration both the stud-receiving part and the attaching part are generally oval-shaped in peripheral outline they can be carried down chutes to the setting mechanism either end foremost. To accomplish the desired result the rivet 10 has been constructed in such a manner that the projecting portion is oval in transverse cross-section and located substantially centrally of the stud-receiving part. Since the attaching plate is also oval in outline, I have formed thereon an aperture 11 which conforms in outline to that of the rivet 10. Therefore, since the aperture 11 is located centrally of the attaching plate 12 it makes no difference which end thereof is first presented to the attaching dies of an attaching machine, because it will be positioned in the same manner properly to receive the rivet 10.

While the parts of the socket installation may be assembled by punching holes in the carrying medium prior to placing it in an attaching machine so that the rivet 10 may pass through an aperture in the carrying medium and then through the aperture in the plate 12, it should be understood that whenever desirable my invention may include the use of a so-called self-piercing rivet construction which is adapted to pierce the carrying medium and form its own hole therethrough. Furthermore, in order to facilitate upsetting of the free end of the rivet, it may be divided for a portion of its length by a series of slits, thereby forming portions which may be readily and easily bent outwardly and downwardly against the plate 12 during the attaching operation.

Since the device illustrated in the drawing is of the three-side lock type now well known to those skilled in the art, the rivet 10 adjacent to where it joins the front face 7 of the stud-receiving part is circular in transverse cross-sectional outline, thereby to provide a stud-receiving aperture of circular outline at the front face 7 and through which the head of the stud extends. The spring jaws 15 are so arranged that when the stud and socket are engaged the shank 3 of the stud and the rivet 10 at one side will be closely adjacent to each other while being spaced substantial distances apart diametrically opposite. Since the shank of the stud is circular in cross-section this spacing effect will be readily apparent and the reasons therefor are well understood by those skilled in the art. Since it is desirable to prevent separation of the fastener members by an outward stress exerted above the center of the stud, while permitting separation of the fastener by the tipping action of the socket relative to the stud when an outward pull is exerted upon the socket adjacent to that side where the shank of the stud and the rivet lie relatively close together, the relatively close arrangement of the parts at one side prevents tipping action at three sides by outward stresses while the relative spacing of the parts at the other side permits the desired tipping action at the predetermined side.

My invention is particularly desirable in connection with three-side lock fastener installations, because, aside from the means provided for engagement with the stud member, only two metallic parts are necessary to provide a strong and durable installation adapted to be easily and quickly assembled with a carrying medium by automatic machines. Furthermore, the aperture through the material is remote from the periphery of the stud-receiving part and, therefore, the material is imperforate for a substantial distance inwardly from the periphery since no attaching prongs are used. The unsightly appearance of holes and ragged edges near the periphery of the socket is, therefore, eliminated without the use of extra plates as was necessary in the constructions where attaching prongs were located adjacent to the periphery of the stud-receiving part.

By arranging the socket installation in such a manner that the stud enters from the rear side thereof, or at that side where the attaching plate is located, the durability of the installation is improved because when stresses are exerted outwardly upon the carrying medium they are transferred to the stud-receiving member and there is no substantial stress exerted against the attaching plate which would tend to disturb the upset end of the rivet.

While I have illustrated and described a preferred embodiment of my invention, I do not wish to be limited thereby, because the scope of my invention is best defined by the following claims.

I claim:

1. A separable snap fastener socket including a sheet metal part having a front face portion provided with a stud-receiving aperture and adapted to be secured to a side of a socket-carrying medium opposite the side from which a stud enters, an attaching plate located on the other side of said medium, integral rivet means extending from the central portion of the front face of said sheet metal part to pass through a carrying medium and secure said plate thereto, said rivet means surrounding said stud-receiving aperture and yieldable stud-engaging means provided as a separate part of the socket and intersecting the stud-receiving aperture to engage a cooperating stud.

2. A three-side lock fastener socket installation comprising, in combination, a carrying medium a stud-receiving part having an exposed front face portion spaced from the carrying medium at one side thereof and provided with a stud-receiving aperture, an attaching plate located at the other side of the carrying medium and a hollow rivet integral with and extending from the front face portion of said stud-receiving part at the stud-receiving aperture and extending through the carrying medium and through the attaching part to secure the parts of the installation together, and said rivet surrounding the stud-receiving aperture and being oval in transverse cross-section at least adjacent to that portion passing through the attaching plate and yieldable stud-engaging means provided as a part of the socket for engagement with a cooperating stud member.

3. A three-side lock fastener socket installation comprising, in combination, a carrying medium, a stud-receiving part having a front face portion spaced from the carrying medium at one side thereof and provided with a stud-receiving aperture, said front face portion located on a side of the carrying medium opposite the side from which a stud enters, an attaching plate located at the other side of the carrying medium and a hollow rivet extending from the front face portion of said stud-receiving part through the carrying medium and through the attaching part to secure the parts of the installation together, and yieldable stud-engaging means provided as a part of the socket.

4. A three-side lock fastener installation comprising, in combination, a carrying medium, a stud-receiving part having a front face portion spaced from the carrying medium at one side thereof, an attaching plate located at the other side of the carrying medium, a hollow rivet having slots in the sides thereof extending from the front face portion of said stud-receiving part through the carrying medium and through the attaching part to secure the parts of the installation together, said rivet being circular in cross-section adjacent to where it joins the front face portion and being oval in transverse cross-section throughout the remainder of the length thereof and a spring assembled with said stud-receiving part and having stud-engaging portions passing through the slots in the sides of said rivet to intersect the stud-receiving aperture provided by said rivet.

5. A three-side lock fastener socket installation comprising, in combination, a carrying medium, a stud-receiving part having a front face portion spaced from the carrying medium at one side thereof, an attaching plate located at the other side of the carrying medium and a hollow rivet extending from the front face portion of said stud-receiving part through the carrying medium and through the attaching part to secure the parts of the installation together, said rivet being circular in cross-section adjacent to where it joins the front face portion and being oval in transverse cross-section throughout the remainder of the length thereof and the axis of the circular cross-sectional portion of said rivet being laterally offset with relation to the axis of the oval cross-sectional portion of said rivet and yieldable stud-engaging means provided as a separate part of the socket.

6. A three-side lock fastener socket installation comprising, in combination, a flexible carrying medium 6, a stud-receiving part located at the front side of the carrying medium 6 and having a front face 7 spaced therefrom, a stud-engaging spring 14 located in the space between said front face 7 and the carrying medium 6, a tubular rivet 10 extending from said front face 7 through the carrying medium 6 and having slots therethrough adjacent to the front face 7, an attaching plate 12 located at the rear side of the carrying medium 6 and having a centrally located oval-shaped aperture 11, said rivet 10 being oval in transverse cross-section and conforming with the aperture 11 in the attaching plate 12, said rivet extending through said aperture 11 and having its free end upset against the plate 12 and said spring having stud-engaging portions passing through said slots in said rivet and intersecting the aperture through the tubular rivet for engagement with a cooperating snap fastener stud.

7. A fastener socket installation comprising, in combination, a carrying medium, a sheet metal part located at one side of the carrying medium and having a front face portion provided with a stud-receiving aperture, said front face portion positioned on the carrying medium on that side opposite the side from which a stud enters, a hollow rivet integral with said front face portion and surrounding the stud-receiving aperture, said hollow rivet having opposed slots adjacent to where it joins the front face portion, a stud-engaging spring having yieldable jaws entered into said slots and intersecting the stud-receiving aperture and an attaching plate located at the other side of the carrying medium, said hollow rivet passing through said carrying medium and having its free end upset against said attaching plate to secure the parts of the installation together.

MOSES F. CARR.